United States Patent [19]
Breuer

[11] 3,880,902
[45] Apr. 29, 1975

[54] INDANOL DIESTERS WITH THIOCARBONIC ACID

[75] Inventor: Hermann Breuer, Regensburg, Germany

[73] Assignee: E. R. Squibb & Sons, Inc., Princeton, N.J.

[22] Filed: Apr. 11, 1974

[21] Appl. No.: 460,007

[52] U.S. Cl............................ 260/455 B; 424/301
[51] Int. Cl........................................... C07c 154/00
[58] Field of Search ................................ 260/455 B

[56] References Cited
UNITED STATES PATENTS
3,637,790  1/1972  Traber et al. .................. 260/455 B Primary Examiner—Lewis Gotts
Assistant Examiner—D. R. Phillips
Attorney, Agent, or Firm—Lawrence S. Levinson; Merle J. Smith

[57] ABSTRACT

New indanol diesters with thiocarbonic acid which have the formula

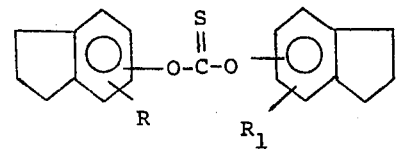

wherein R and $R_1$ each is hydrogen, lower alkyl, halo or trifluoromethyl are useful as fungistatic agents.

8 Claims, No Drawings

INDANOL DIESTERS WITH THIOCARBONIC ACID

SUMMARY OF THE INVENTION

This invention relates to new indanol O,O'-diesters with thiocarbonic acid which have the formula (I)

wherein R and $R_1$ each is hydrogen, lower alkyl, halo or trifluoromethyl.

The lower alkyl groups are straight or branched chain aliphatic hydrocarbon groups of up to seven carbon atoms like methyl, ethyl, propyl, isopropyl and the like. The $C_1$–$C_4$ alkyl groups are preferred, especially ethyl and methyl.

All four common halogens are represented by the term "halo," but chloro and bromo are preferred, especially the first.

Preferred are the O,O'-diester with 5-indanol and the esters with 4-indanol which have the formula (II)

wherein R and $R_1$ are independently hydrogen or halo, especially chloro. Preferably R and $R_1$ are the same.

DETAILED DESCRIPTION OF THE INVENTION

The compounds of formula I are produced by reacting an unsubstituted or substituted indanol of the formula (III)

with thiophosgene or with a thionocarbonic acid ester chloride of the formula (IV)

in an inert organic solvent like chloroform in the presence of a base like sodium hydroxide.

The new compounds of this invention are fungistatic agents useful against infections caused by Dermatophytes such as *Trichophyton mentagrophytes* and can be applied topically to the skin of an affected animal species such as mice, guinea pigs or the like in a conventional vehicle such as cream, ointment or lotion at a concentration of about 0.1 to 3% (by weight).

The following examples are illustrative of the invention.

EXAMPLE 1

A solution of 16.86 g. (0.1 mol.) of 7-chloro-4-indanol in 50 ml. of 2N sodium hydroxide solution is added dropwise at 20° C. with vigorous stirring to a solution of 5.75 g. (0.05 mol.) of thiophosgene in 25 ml. of anhydrous chloroform. The mixture is stirred at room temperature for 60 hours. The layers are separated, the chloroform layer is washed twice with water, dried with calcium chloride and concentrated. 14.9 g. of crude 7-chloro-4-indanol, O,O'-diester with thiocarbonic acid are obtained. The crude product is purified by recrystallizing twice from ethanol, yield 8.25 g.; m.p. 165°–167°C.

EXAMPLE 2

By substituting 5-indanol for the 7-chloro-4-indanol in the procedure of Example 1, 5-indanol, O,O'-diester with thiocarbonic acid is obtained, yield 63%; m.p. 146°–148°C.

EXAMPLE 3

By substituting 4-indanol for the 7-chloro-4-indanol in the procedure of Example 1, 4-indanol, O,O'-diester with thiocarbonic acid is obtained.

EXAMPLE 4

By substituting 7-chloro-5-indanol for the 7-chloro-4-indanol in the procedure of Example 1, 7-chloro-5-indanol, O,O'-diester with thiocarbonic acid is obtained.

EXAMPLE 5

By reacting chlorothioformic acid, O, 2-indanyl ester with 7-trifluoromethyl-5-indanol as in Example 1, 7-trifluoromethyl-5-indanol, O,O'-diester with thiocarbonic acid is obtained.

EXAMPLE 6

By substituting 6-methyl-4-indanol for the 7-chloro-4-indanol in the procedure of Examale 1, 6-methyl-4-indanol, O,O'-diester with thiocarbonic acid is obtained.

EXAMPLE 7

By substituting 6-bromo-4-indanol for the 7-chloro-4-indanol in the procedure of Example 1, 6-bromo-4-indanol, O,O'-diester with thiocarbonic acid is obtained.

What is claimed is:

1. A compound of the formula wherein R and $R_1$ each is hydrogen, lower alkyl, halo or trifluoromethyl.

2. A compound of the formula

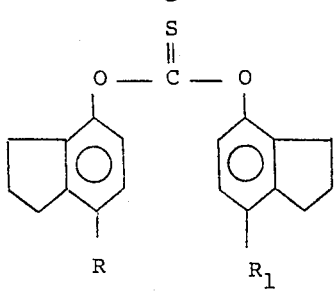

wherein R and R₁ have the same meaning as in claim 1.

3. A compound of the formula

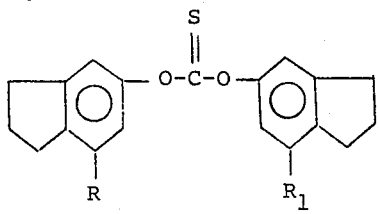

wherein R and R₁ have the same meaning as in claim 1.

4. A compound as in claim 2 wherein R and R₁ each is hydrogen or halo.

5. A compound as in claim 3 wherein R and R₁ each is hydrogen or halo.

6. A compound as in claim 2 wherein R and R₁ each is chloro.

7. A compound as in claim 3 wherein R and R₁ each is hydrogen.

8. A compound as in claim 3 wherein R is hydrogen and R₁ is trifluoromethyl.

* * * * *